May 17, 1966 J. F. SAUT 3,251,103
FASTENING MEMBERS AND METHOD
Filed May 11, 1961 5 Sheets-Sheet 1

INVENTOR.
JULES F. SAUT
BY
HIS ATTORNEYS

May 17, 1966  J. F. SAUT  3,251,103
FASTENING MEMBERS AND METHOD
Filed May 11, 1961  5 Sheets-Sheet 2

INVENTOR.
JULES F. SAUT
BY Glenn, Jackson,
Palmer & Matthews
HIS ATTORNEYS

May 17, 1966  J. F. SAUT  3,251,103
FASTENING MEMBERS AND METHOD
Filed May 11, 1961  5 Sheets-Sheet 3
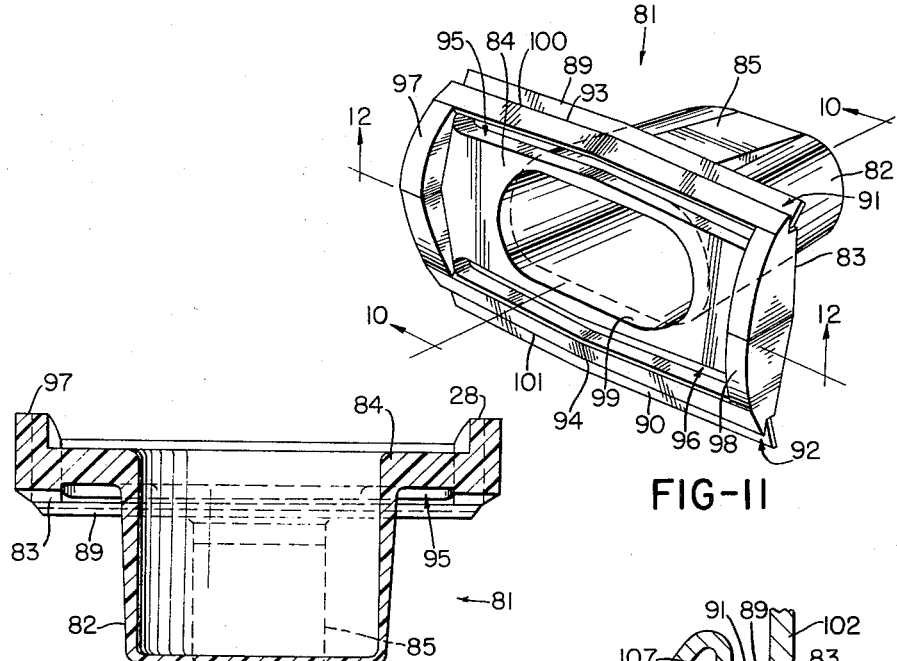
FIG-11
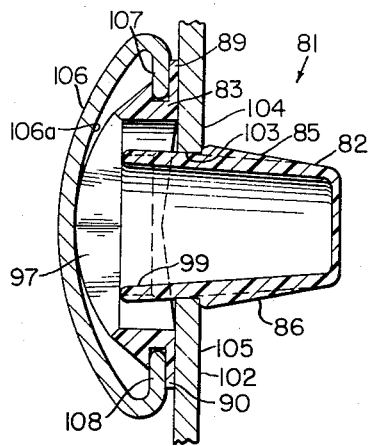
FIG-12
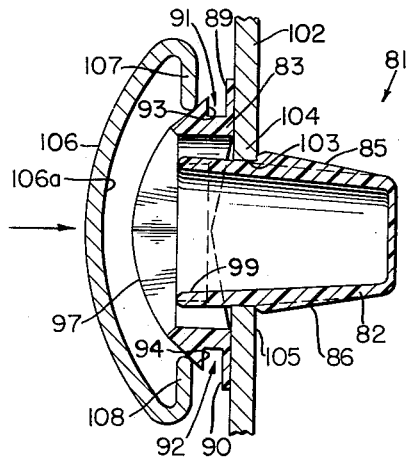
FIG-13
FIG-14
INVENTOR.
JULES F. SAUT
BY
Glenn, Jackson,
Palmer & Matthews
HIS ATTORNEYS May 17, 1966    J. F. SAUT    3,251,103
FASTENING MEMBERS AND METHOD
Filed May 11, 1961    5 Sheets-Sheet 4
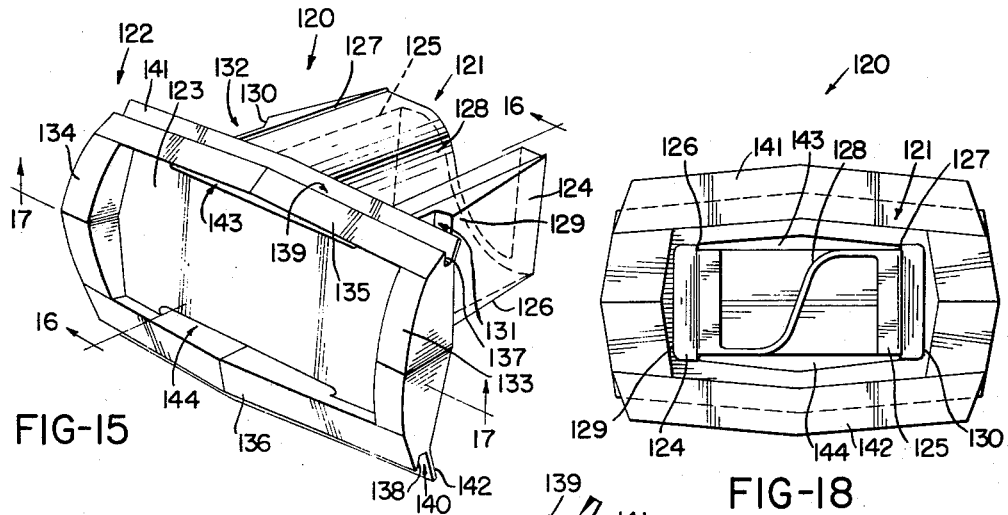
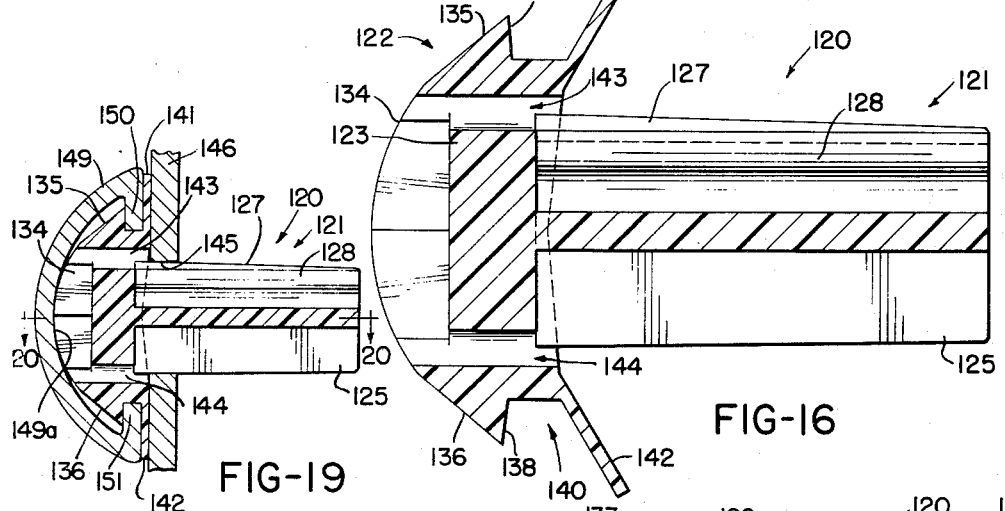
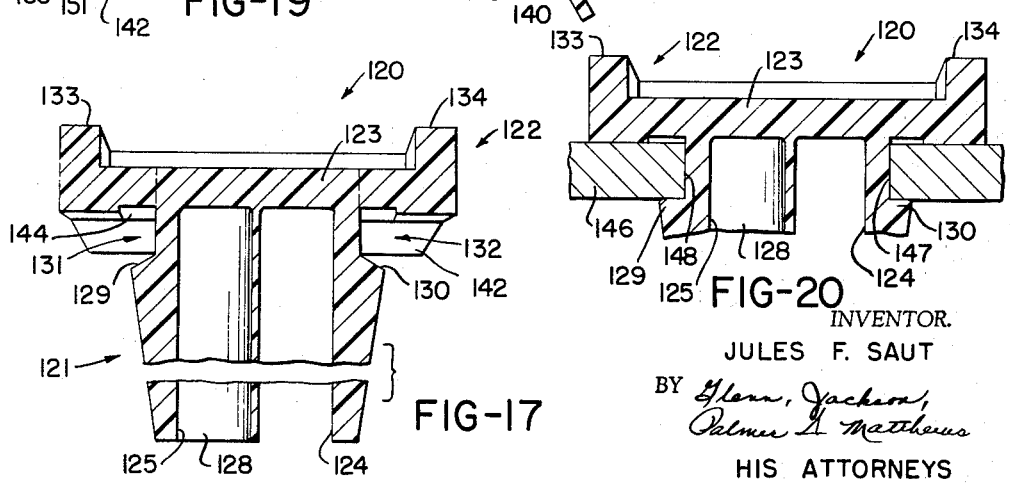
INVENTOR.
JULES F. SAUT
BY Glenn, Jackson,
Palmer & Matthews
HIS ATTORNEYS May 17, 1966 J. F. SAUT 3,251,103
FASTENING MEMBERS AND METHOD
Filed May 11, 1961 5 Sheets-Sheet 5
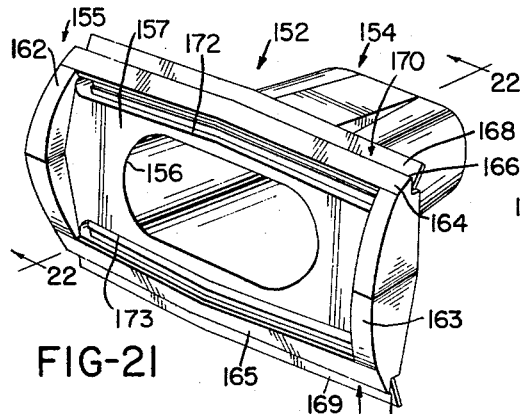
FIG-21
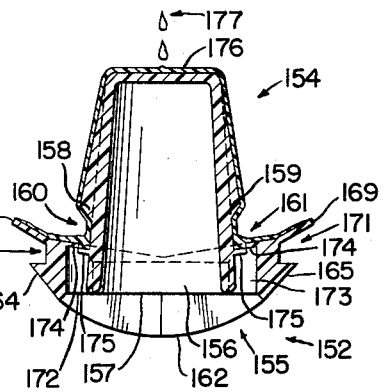
FIG-22
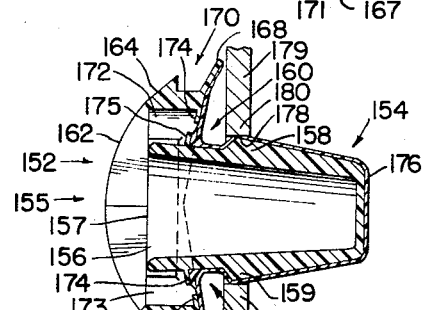
FIG-23
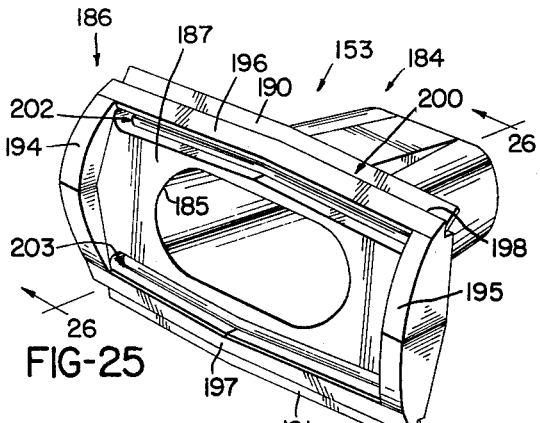
FIG-25
FIG-24
FIG-26
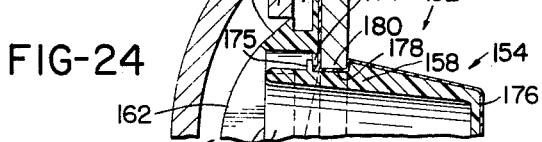
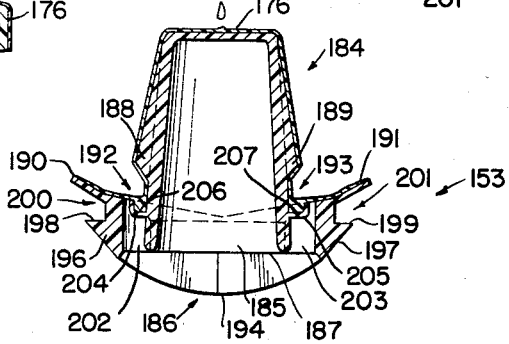
FIG-27
FIG-28
INVENTOR.
JULES F. SAUT
BY Glenn, Jackson,
Palmer & Matthews
HIS ATTORNEYS

United States Patent Office 3,251,103
Patented May 17, 1966

3,251,103
FASTENING MEMBERS AND METHOD
Jules F. Sauf, Chesterfield County, Va., assignor to Reynolds Metals Company, Richmond, Va., a corporation of Delaware
Filed May 11, 1961, Ser. No. 109,300
9 Claims. (Cl. 24—73)

This invention relates to improved fastening members and to methods for utilizing the same or the like. More specifically, this invention relates to fastening members for securing trim strips or the like to vehicle bodies or the like.

Heretofore, relatively rigid metal fastening members or clips have been utilized for securing trim or other ornamentations to vehicle bodies. Such prior-known metal clips each have one end thereof appropriately secured in an aperture formed in the particular vehicle body in such a manner that the other enlarged end thereof extends from the vehicle body and is utilized to secure the trim strip or the like to the vehicle body. The trim strip is secured to the metal clip by forcing a pair of opposed and inwardly facing flanges of the trim strip or the like over the enlarged, protruding end of the fastening member until the flanges are received between the enlarged section and the vehicle body and spring back into their normal positions to hold the trim strip or the like in place.

It has been found that such prior-known methods and fastening structures cause adverse damage to the particular trim strips or the like by scratching or marring the same when the trim strips or the like are forced over the enlarged sections of the relatively rigid metal fastening members. Such damage is particularly noted when the relatively thin layer of ornamental and protective coating of the trim strip is scratched and peeled away, such as the chrome plating thereof. Further, when a trim strip or the like is forced over the enlarged sections of the prior-known fastening members or clips, there is a tendency for the trim strip or the like to be permanently bulged or deformed in the regions of the prior-known fastening elements. This latter adverse condition is particularly aggravated when relatively thin trim strips of aluminum-containing metal or the like are being secured to the vehicle bodies.

Sometimes the trim strips or other ornamentation are forced over the protruding ends of the prior-known metal fasteners or clips by tapping the exterior of the trim strip or the like with a cushioned hammer or the like. Not only does such tapping operation tend to dent and permanently disfigure such trim, but also it has been found that relatively thin and light-weight trim strips or the like formed of aluminum-containing metal are permanently deformed when only slightly tapped on the exterior surface thereof, whereby aluminum trim strips and the like cannot be readily utilized with the prior-known fastening devices.

However, according to the teachings of this invention, various fastening members are provided which will not scratch, mar, or bend trim strips or the like as severely when the same are being secured to vehicle bodies or the like by the methods and/or fastening members of this invention, even though the trim strips or the like are relatively thin and made from aluminum-containing metal or the like. Such fastening members are formed in a relatively simple and effective manner whereby the same are relatively inexpensive, as well as perform their securing function in a rapid and simple manner.

Further, the trim strips or other elements being secured by the fastening members of this invention can be interconnected to the fastening members by a simple hand operation without requiring tapping or hammering on the exterior surface thereof, which would tend to deform the trim or the like. Therefore, relatively deformable materials can be utilized to form the elements secured by the fastening members and methods of this invention.

In particular, one feature of this invention is to provide a relatively flexible fastening member having two interconnected sections, each being provided with an opposed pair of channels longitudinally spaced from the pair of opposed channels in the other section. One of the sections is inserted in a suitable aperture formed in the vehicle body or the like by inwardly deforming that section until the opposed edges of the vehicle body defining the aperture thereof are received in the channels of that one section and permit the deformed section to expand outwardly to hold the fastening member in a fixed position relative to the vehicle body. The trim strip or the like is then interconnected to the other section of the fastening member by telescoping the opposed and inwardly facing flanges of the trim strip or the like over the other section. However, during such telescoping operation, the trim strip or the like remains in its original cross-sectional configuration as the other section of the fastening member is inwardly deformed until the flanges of the strip or the like are received in the channels of the other section and permit the other section to expand outwardly to hold the trim strip or the like in a fixed position relative the vehicle body.

Thus, not only does the flexible characteristic of the fastening member prevent bulging or bending of the trim strip or the like, but the same also prevents scratching or marring of the trim strip.

Another feature of this invention is to provide tabs or the like extending outwardly from the fastening member between the pairs of channels thereof, the tabs providing vibration dampening means between the trim strips or the like and the vehicle bodies. Such tabs also function to assist in the securing action of the fastening members and provide means for effectively sealing the apertures in the vehicle bodies.

Accordingly, it is an object of this invention to provide an improved fastening member having one or more of the novel features set forth above or hereinafter shown or described.

Another object of this invention is to provide an improved combination wherein two elements are secured together by such a fastening member or the like.

Another object of this invention is to provide an improved method for securing together such elements or the like.

Other objects, uses and advantages of this invention are apparent from a reading of this description which proceeds with reference to the accompanying drawings forming a part thereof and wherein:

FIGURE 11 is a perspective view of the fastening member illustrated in FIGURE 10.

FIGURE 12 is a cross-sectional view of the fastening member illustrated in FIGURE 11 and is taken on line 12—12 thereof.

FIGURE 13 is a view similar to FIGURE 6 and illustrates the method of initially securing a trim strip or the like to a vehicle body by the fastening member of FIGURE 11.

FIGURE 14 is a view similar to FIGURE 13 and illustrates the trim strip completely secured to the vehicle body by the fastening member of FIGURE 11.

FIGURE 15 is a perspective view illustrating another fastening member of this invention.

FIGURE 16 is an enlarged, axial, cross-sectional view of the fastening member illustrated in FIGURE 15 and is taken on line 16—16 thereof.

FIGURE 17 is a reduced, axial, cross-sectional view of the fastening member illustrated in FIGURE 15 and is taken on line 17—17 thereof.

FIGURE 18 is a rear view of the fastening member illustrated in FIGURE 15.

FIGURE 19 is a reduced, axial, cross-sectional view of the fastening member illustrated in FIGURE 15 and illustrates the method of utilizing the same to interconnect a trim strip or the like to a vehicle body.

FIGURE 20 is a view similar to FIGURE 19 and is taken on line 20—20 of FIGURE 19.

FIGURE 21 is a perspective view of another embodiment of this invention.

FIGURE 22 is an axial, cross-sectional view taken on line 22—22 of FIGURE 21 and illustrates the method of applying a sealant thereto.

FIGURE 23 is a view similar to FIGURE 22 and illustrates the method of inserting the fastening member of FIGURE 21 in a suitable aperture in a vehicle body or the like.

FIGURE 24 is a fragmentary view similar to FIGURE 23 and illustrates the method of securing a trim strip or the like to the fastening member of FIGURE 21.

FIGURE 25 is a perspective view of another fastening member of this invention.

FIGURE 26 is a view similar to FIGURE 22 and is taken on line 26—26 of FIGURE 25.

FIGURE 27 is a view similar to FIGURE 23 and illustrates the method of inserting the fastening member of FIGURE 25 in a suitable aperture in a vehicle body or the like.

FIGURE 28 is a fragmentary view similar to FIGURE 27 and illustrates the method of securing a trim strip or the like to the fastening member of FIGURE 25.

Figure 1:
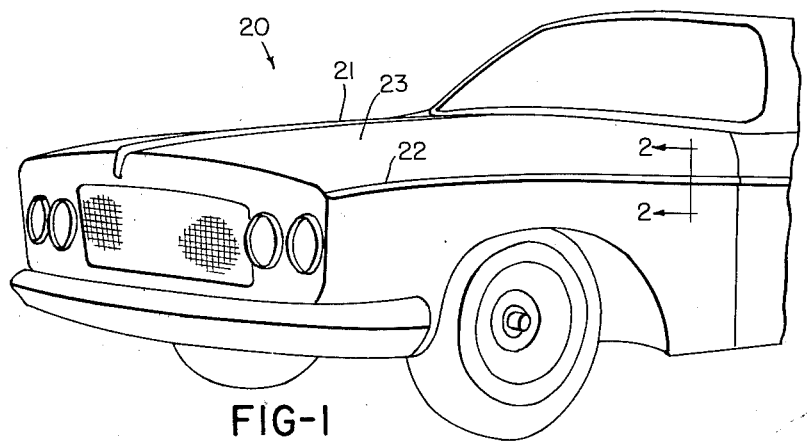
FIGURE 1 is a fragmentary, perspective view illustrating a vehicle body having ornamental trim strips or moldings secured thereto by fastening members and methods of this invention.

While the various fastening members and methods of this invention are hereinafter described in connection with means for securing a trim strip or molding to a vehicle body, it is to be understood that the same can be utilized for fastening other members, such as escutcheons or the like to the vehicle body, or other elements together, such as plates or the like, as desired. Therefore, this invention is not to be limited to only the applications thereof illustrated in the drawings as such drawings are merely to illustrate just one of the many uses of this invention.

Referring now to FIGURE 1, the reference numeral 20 generally indicates a vehicle, such as an automobile or the like, having a plurality of decorative trim strips or moldings 21 and 22 secured to the vehicle body 23 by the methods and fastening members of this invention.

Figures 2, 3, 4:
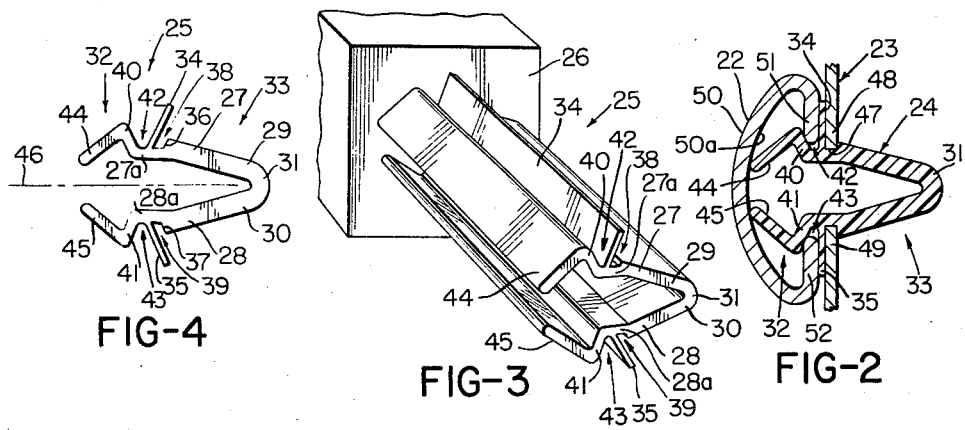
FIGURE 2 is an enlarged cross-sectional view taken on line 2—2 of FIGURE 1 and illustrates one embodiment of this invention.
FIGURE 3 is a schematic, perspective view illustrating the method of making the fastening member illustrated in FIGURE 2.
FIGURE 4 is an end view of the fastening element illustrated in FIGURE 2.

For example, as illustrated in FIGURE 2, the trim strip or molding 22 is secured to the vehicle body 23 by a flexible fastening member 24 of this invention in a manner hereinafter described, the fastening member 24 permitting the trim strip 22 to be secured to the vehicle body 23 without scratching, marring or permanently bending the trim strip 22 or requiring the same to be tapped in place with a hammer or the like which would tend to permanently dent the attractive exterior surface of the trim strip 22.

While the fastening member 24 can be formed of any suitable, flexible material and made in any suitable manner, the embodiment of the fastening member 24 illustrated in the drawings is formed of a flexible and extrudable material, such as polypropylene, polyethylene, or the like, extruded into elongated lengths 25 by conventional extruding apparatus 26, FIGURE 3, in a manner well known in the art.

The individual fastening members 24 are then cut from the extruded stock 25 in any desired lengths.

As illustrated in FIGURES 3 and 4, the extruded stock 25 has the same cross-sectional configuration throughout its entire length and includes a pair of legs 27 and 28 integrally interconnected together at the respective converging end portions 29 and 30 thereof by an arcuate portion 31 whereby the right-hand portions of the legs 27 and 28, together with the arcuate portion 31, define a substantially V-shaped cross-sectional configuration. The converging end portions 29 and 30 of the legs 27 and 28 are integrally connected at the left-hand end thereof to substantially parallel disposed portions 27a and 28a.

Each leg 27 and 28 is divided into two sections, generally indicated by the reference numerals 32 and 33, by tab means 34 and 35 respectively extending outwardly from the central portions 27a and 28a of the legs 27 and 28. The tab means 34 and 35 respectively cooperate with notched portions 36 and 37 formed respectively in the legs 27 and 28 to define a pair of opposed channel means 38 and 39 in the section 33 of the extruded stock 25. Similarly, the tab means 34 and 35 cooperate with outwardly diverging portions 40 and 41 of the respective legs 27 and 28 to define a pair of opposed channel means 42 and 43 in the section 32 of the extruded stock 25, the outwardly directed portions 40 and 41 being respectively integrally connected to the central portions 27a and 28a of the legs 27 and 28.

The left-hand end portions 44 and 45 of the respective legs 27 and 28 diverge inwardly toward each other and are integrally interconnected to the outwardly directed portions 40 and 41 of the legs 27 and 28.

While the extruded stock 25 can be formed with any desired dimensions, one embodiment thereof which has been found to be satisfactory has a width of approximately 0.763 of an inch from the ends 44 and 45 of the legs 27 and 28 to the arcuate portion 31 thereof. The height of the extruded stock from the tip of the tab means 34 to the tip of the tab means 35 is approximately 0.625 of an inch. The end portions 29 and 30 of the respective legs 27 and 28 are disposed at acute angles of approximately 15° relative to a center line 46 of the extruded stock 25 as illustrated in FIGURE 4. The tab means 34 and 35 are respectively disposed at acute angles of approximately 75° relative to the center line 46, and the outwardly directed portions 40 and 41 of the respective legs 27 and 28 are also disposed at acute angles of approximately 75° relative to the center line 46. The left-hand end portions 44 and 45 of the respective legs 27 and 28 are disposed at acute angles of approximately 60° relative to the center line 46. The portions 27a, 28a, 40, 41, 44 and 45 of the legs 27 and 28 are approximately 0.047 of an inch thick with the end portions 29 and 30 thereof being approximately 0.075 of an inch thick. The tabs 34 and 35 are approximately 0.020 of an inch thick and the width of the notches 36 and 37 is approximately 0.040 of an inch (a dimension slightly larger than the gauge of metal utilized for an automobile body).

After the fastening member stock 25 has been formed in the above manner, the same is cut into suitable lengths to form the individual fastening members 24.

The fastening members 24 are utilized to secure the trim strip 22 to the vehicle body 23 in the following manner.

Figures 5, 6:
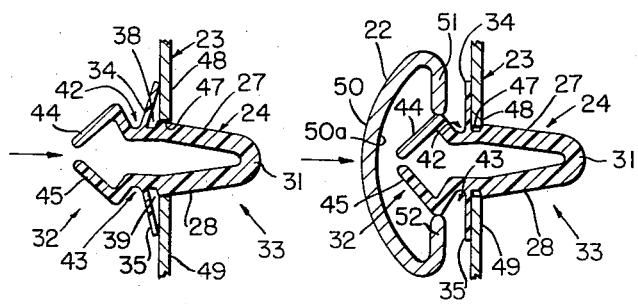
FIGURE 5 illustrates the method of initially securing the fastening element of FIGURE 4 to the vehicle body of FIGURE 1.
FIGURE 6 is a view similar to FIGURE 5 and illustrates the method of initially securing a trim strip or the like to the vehicle body by the fastening member of FIGURE 4.

As illustrated in FIGURES 2, 5 and 6, the vehicle body 23 is provided with a desired number of substantially long and narrow rectangular apertures 47 spaced along the desired location thereof, each aperture 47 defining a pair of opposed parallel edges 48 and 49 of the body 23 and having a length substantially the same as the length of an individual fastening member 24. While the width of each aperture 47 can have any suitable dimension, it is preferred that the width is slightly smaller than the width between the bottom walls of the notches 36 and 37 of the fastening member 24 to be received therein for a purpose hereinafter described.

After the apertures 47 have been formed in the desired positions along the vehicle body 23, either after the individual panels of the body have been assembled or preferably before, by a stamping or die cutting operation, each fastening element 24 is secured to the vehicle body 23 in the manner illustrated in FIGURE 5. In particular, the section 33 of each fastening member 24 is inserted in its respective aperture 47 by inwardly deforming the legs 27 and 28 of the fastening member 24 about the arcuate portion 31 thereof as the fastening member 24 is forced toward the vehicle body 23 in the direction of the arrow in FIGURE 5, until the edges 48 and 49 of the particular aperture 47 are received in the channels 38 and 39 of the legs 27 and 28 in the manner illustrated in FIGURE 6 and permit the legs 27 and 28 to spring outwardly and grip the vehicle body 23. As the section 33 of the particular fastening member 24 is inserted in the aperture 47, the tab means 34 and 35 thereof begin to engage the exterior surface of the vehicle body 23 before the edges 48 and 49 are fully received in the channel means 38 and 39 as illustrated in FIGURE 5. When the edges 48 and 49 of the body 23 are fully received in the channels 38 and 39 of the fastening member 24, the legs 27 and 28 of the fastening member spring outwardly through the natural resiliency of the material forming the fastening member 24 to grip the vehicle body 23 and hold the fastening member 24 in a fixed position relative to the vehicle body 23. When the width of the aperture 47 is slightly smaller than the width of the fastening member 24 between the bottom walls of the channels 38 and 39 thereof, the legs 27 and 28 of the inserted fastening member 24 are continually pressing outwardly against the edges 48 and 49 of the vehicle body 23, even though the fastening member 24 is fully inserted therein whereby the fastening member 24 is fixed to the vehicle body 23.

The tab means 34 and 35 are progressively compressed against the exterior surface of the vehicle body 23 during the inserting operation of the section 33 of the fastening member 24, and when the fastening member 24 is disposed in the position illustrated in FIGURE 6, the tab means 34 and 35 are fully compressed against the exterior of the vehicle body 23 and tend to seal the aperture 47 thereof from the exterior of the vehicle body 23, whereby moisture and the like cannot enter the aperture 47 and pass to the interior of the vehicle body 23. The natural resiliency of the bent tab means 34 and 35 of the fastening member 24 tends to draw the fastening member 24 from the vehicle body 23 and, thus, cooperates with the notched portions 36 and 37 of the fastening member 24 to hold the notched portions 36 and 37 against the interior surface of the vehicle body 23 whereby the fastening member 24 is held in a fixed position relative to the vehicle body 23 by the edges 48 and 49 thereof.

The trim strip 22 is then secured to one or more of the fastening members 24 secured to the vehicle body 23 in the above manner and comprises a substantially arcuate or other decorative facing 50 having a pair of opposed and inwardly facing flanges 51 and 52 at the outer ends thereof in a conventional manner. The trim strip 22 is secured to the protruding sections 32 of each fastening member 24 by telescoping and forcing the flanges 51 and 52 over the sections 33 of the fastening member 24 in the manner illustrated in FIGURE 6 whereby the legs 27 and 28 of the sections 32 of each fastening member are deformed inwardly to permit such telescoping relation. Since the end portions 44 and 45 of each leg 27 and 28 of each fastening member 24 are converging toward each other, the same readily permit the flanges 51 and 52 of the inserted trim strip 22 to progressively cam the legs 27 and 28 toward each other while the trim 22 is being pushed in the direction of the arrow of FIGURE 6 by hand, without the use of a hammer in prior-known methods and without outward excessively deforming the flanges 51 and 52 of the trim strip 50.

The trim strip 22 is progressively telescoped over the progressively deforming sections 32 of the fastening members 24 until the flanges 51 and 52 thereof are respectively received in the channel means 42 and 43 in the manner illustrated in FIGURE 2, thereby permitting the legs 27 and 28 of each fastening member 24 to spring outwardly through the natural resiliency of the fastening member 24. As the legs 27 and 28 spring outwardly, the outwardly directed portions 40 and 41 thereof engage the inside surface of the flanges 51 and 52 of the trim strip 22 and compress the same against the exterior surfaces of the tab means 34 and 35 to frictionally hold the trim strip 22 in a fixed position relative to the vehicle body 34. In this manner, the tab means 34 and 35 are compressed between the vehicle body 23 and the flanges 51 and 52 of the trim strip 22 and provided resilient dampening means therebetween to prevent vibrations and rattling.

If desired, the fastening member 24 and trim strip 22 can be so constructed and arranged that the inside surface 50a of the trim strip 22 engages the end portions 44 and 45 of the legs 27 and 28 of each fastening member 24 before the flanges 51 and 52 of the trim strip 22 are fully received in the channels 42 and 43 of the fastening member 24. Therefore, when the flanges 51 and 52 of the trim strip 22 are fully received in the channels 42 and 43 of the fastening members 24, the end portions 44 and 45 of the fastening member 24 are placed under compression between the inside surface 50a and flanges 51 and 52 of the trim strip 22 and continually urge the flanges 51 and 52 of the trim strip 22 against the tab means 34 and 35 in stacked relation against the vehicle body 23 to firmly hold the trim strip 22 in place. The compressed end portions 44 and 45 are also utilized to deaden any vibrations of the trim strip 50. Also, the width between the flanges 51 and 52 of the trim strip 22 can be slightly smaller than the width between the bottom walls of the channels 42 and 43 of each fastening member 24 whereby the deformed legs 27 and 28 of each fastening member 24 continually urged the portions 40 and 41 thereof outwardly against the inside surfaces of the flanges 51 and 52 to hold the flanges 51 and 52 of the trim strip 22 and the tab means 34 and 35 in stacked relation against the vehicle body 23.

While the trim strip 22 has been described as being assembly to the vehicle body 23 after the fastening members 24 have been secured to the vehicle body 23, it is to be understood that the fastening members 24 can be first secured to the trim strip 22, if desired, and then the trim strip 22 and attached fastening members 24 can be secured to the vehicle body 23.

Further while a plurality of fastening members 24 are utilized to secure a relatively long trim strip 22 to the vehicle body 23, it is to be understood that only one fastening member 24 can be utilized to secured a relatively short trim strip or other decorative article to the vehicle body 23 when desired, the fastening member 24 functioning in the same manner as set forth above.

Therefore, it can be seen that as the trim strip 22 is secured to the vehicle body 23 solely by the fastening members 24, the flanges 51 and 52 of the trim strip 22 are not scratched or marred and the same are not bent outward excessively during the assembly operation whereby the trim strip 22 is unaffected by the securing operation. Further, the trim strip 22 is secured to the vehicle body 23 solely by hand operations whereby expensive installation equipment is eliminated and no damage can occur to the trim strip 22 by a hammering operation that may be required in prior-known methods.

Should the secured trim strip 22 or the like be subsequently damaged and need to be replaced, the damaged trim strip 22 can be readily removed from the vehicle body by forcing the strip 22 off of the sections 32 of the fastening members 24. In particular, by backing the trim strip off of the sections 32 of the fastening members 24, the flanges 51 and 52 thereof cam against the portions 40 and 41 of the legs 27 and 28 and progressively deform the legs 27 and 28 inwardly to permit the trim strip 22 to be removed from the fastening members 24. However, because the portions 40 and 41 of the legs 27 and 28 are disposed at a greater angle relative to the center line 46 of each fastening member 24 than the end portions 44 and 45 thereof, it is more difficult to back the trim strip 22 off of the sections 32 of the fastening members 24 than to insert the trim strip 22 onto the same. Therefore, the trim strip 22 is firmly held in place by the fastening members 24 during normal usage of the vehicle 20, but permit ready removal thereof when desired.

Alternately, the trim strip can be removed from the vehicle body by merely reaching under the same and compressing the end portions 29 and 30 of the legs 27 and 28 of each fastening member together so that the section 33 thereof can be readily removed from the particular aperture when the trim strip 22 is grasped and moved away from the vehicle body 23.

Since the fastening members 24 are not damaged when the damaged trim strip 22 or the like is removed from the vehicle body 23, the fastening members 24 can be used to secure the new strip in place in the above manner.

Figure 7:
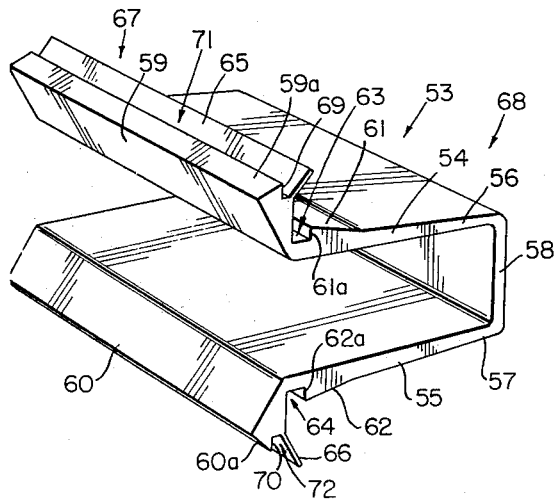
FIGURE 7 is a perspective view of another fastening member of this invention.
Figure 8:
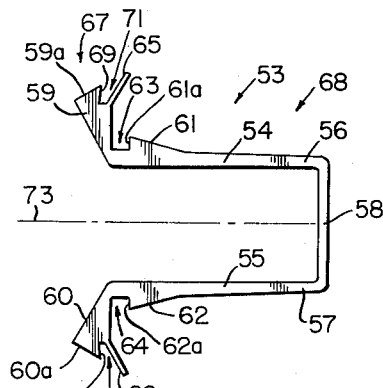
FIGURE 8 is an end view of the fastening member illustrated in FIGURE 7.

Another fastening member of this invention is illustrated in FIGURES 7 and 8 and is generally indicated by the reference numeral 53.

The fastening member 53 can be extruded in the same manner as the fastening members 24 and is formed of resilient material, such as polypropylene, polyethylene, or the like. The fastening member 53 is cut from an extruded stock thereof (not shown) and comprises two substantially parallel disposed legs 54 and 55 integrally interconnected at the ends 56 and 57 thereof by a perpendicularly disposed end portion 58 to define a substantially U-shaped cross-sectional configuration. The legs 54 and 55 respectively have outwardly diverging integrally connected end portions 59 and 60 respectively provided with converging cam surfaces 59a and 60a for a purpose similar to the end portions 44 and 45 of the fastening member 24.

The substantially parallel portions of the legs 54 and 55 are provided with outwardly flaring flanges 61 and 62 tapering outwardly from the ends 56 and 57 thereof toward the end portions 59 and 60 to define notches or channel means 63 and 64 between the end portions 59 and 60 thereof and the outwardly directed left-hand ends 61a and 62a of the flanges 61 and 62.

Tab means 65 and 66 extend outwardly from the end portions 59 and 60 of the legs 54 and 55 and divide the fastening member 53 into two sections 67 and 68 whereby the channel means 63 and 64 are carried by the section 68 of the fastening member 54 and are defined in part by the tab means 65 and 66.

Similarly, the tab means 65 and 66 cooperate with notch means 69 and 70 formed in the end portions 59 and 60 of the legs 54 and 55 to define a pair of opposed channel means 71 and 72 carried by the section 67 of the fastening member 53.

While the fastening member 53 can have any desired dimension, the dimensions of a fastening member 53 which has been found satisfactory for the intended purpose are as follows. The overall width of the particular fastening member 53 from the end wall 58 to the end portions 59 and 60 is approximately 0.500 of an inch, and the distance between the outer tips of the tab means 65 and 66 is approximately 0.578 of an inch. The end portions 59 and 60 of the legs 54 and 55 are disposed at acute angles of approximately 60° relative to the center line 73 of the fastening member 53, and, similarly, the tab means 65 and 66 are disposed at acute angles of 60° relative to the center line 73 of the fastening member 53. The main part of the legs 54 and 55 and the end wall 58 are approximately 0.023 of an inch thick, while the thickest part of the flanges 61 and 62 is 0.055 of an inch. The tabs 65 and 66 are approximately 0.020 of an inch thick. The width of the bottom walls of the channel means 63 and 64 is approximately 0.040 of an inch (slightly larger than the gauge of metal utilized for automobile bodies), while the width of the bottom walls of the channels 71 and 72 is approximately 0.025 of an inch.

The fastening member 53 is utilized to secure a trim strip to an automobile body in substantially the same manner as the fastening member 24 previously described.

Figure 9:
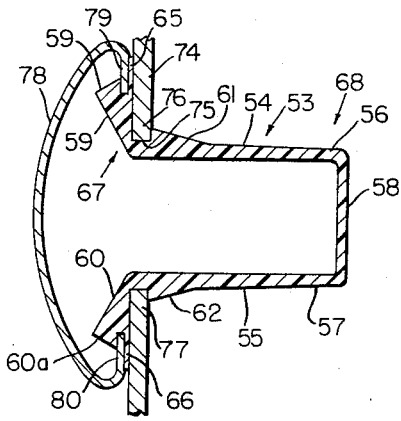
FIGURE 9 is a view similar to FIGURE 2 illustrating the method of securing a trim strip or the like to a vehicle body by the fastening member of FIGURE 7.

In particular, the vehicle body 74, FIGURE 9, is provided with an elongated rectangular aperture 75 defining opposed edges 76 and 77 thereof throughout a length substantially equal to the length of the particular fastening member 53. The section 68 of the fastening member 53 is inserted in the aperture 75 of the vehicle body 74 by inwardly deforming the legs 54 and 55 thereof during such inserting operation until the edges 76 and 77 of the vehicle body 74 are received in the channel means 63 and 64 thereof to permit the legs 54 and 55 to spring outwardly and hold the fastening member 53 in a fixed position relative thereto. The tab means 65 and 66 thereof cooperate with the exterior surface of the vehicle body 74 in substantially the same manner as the tab means 34 and 35 of the fastening member 24 to hold the fastening member 53 in a fixed position relative to the vehicle body 74.

Subsequently, a trim 78 having a pair of opposed and inwardly directed flanges 79 and 80 at the outer end thereof is telescoped over the section 67 of fastening member 53 by inwardly deforming the end portions 59 and 60 of the legs 54 and 55 by the flanges 79 and 80 of the trim strip 78 until the flanges 79 and 80 are respectively received in the channel means 71 and 72 of the fastening member 53 and permit the end portions 59 and 60 to spring outwardly and compress the flanges 79 and 80 against the tab means 65 and 66 to hold the trim strip 78 in a fixed position relative to the vehicle body 74.

While the fastening members 24 and 53 have been illustrated as being extruded members, it is to be understood that the same could be formed by a molding operation if desired.

Figure 10:
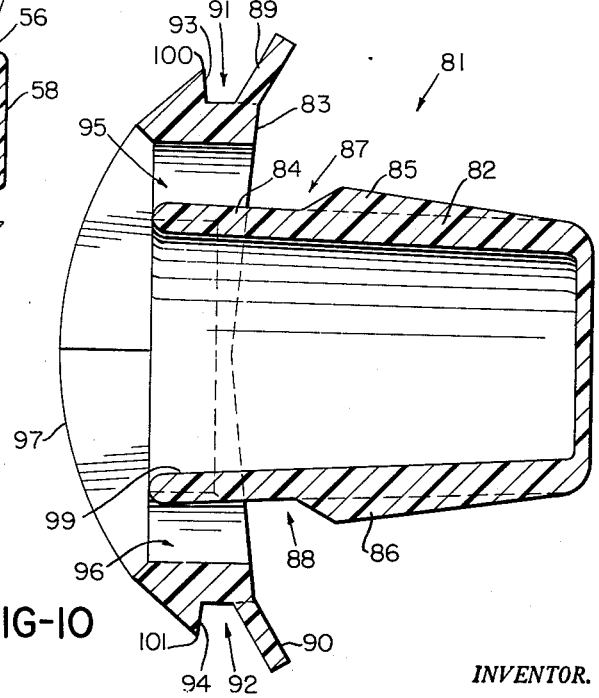
FIGURE 10 is an enlarged, cross-sectional view of another fastening member of this invention and is taken on line 10—10 of FIGURE 11.

In particular, another fastening member of this invention is illustrated in FIGURE 10 and is generally indicated by the reference numeral 81, the fastening member 81 being molded from suitable flexible material, such as polypropylene, polyethylene, or the like.

The fastening member 81 comprises a substantially thimble-shaped section 82 interconnected to a plate-like section 83 at the open end 84 of the thimble-shaped section 82, in the manner illustrated in FIGURES 10 and 11.

A pair of beveled flanges 85 and 86 extend from opposite sides of the thimble-shaped section 82 and cooperate with the plate-like section 83 to define a pair of opposed channel means 87 and 88 therebetween, the channels 87 and 88 being defined in part by tab means 89 and 90 extending from the plate-like section 83 and being angularly disposed toward the thimble-shaped section 82. The tab means 89 and 90 also define a pair of opposed channel means 91 and 92 at notched portions 93 and 94 formed in the plate-like section 83.

The plate-like section 83 is provided with a pair of elongated openings 95 and 96 throughout the major length thereof and between the thimble-shaped section 82 and the channel means 91 and 92 to render the plate-like section 83 more resilient at the channel means 91 and 92 thereof for a purpose hereinafter described.

The opposed ends of the plate-like section 83 are provided with outwardly directed arcuate flanges 97 and 98 to provide bumper means for a trim strip in a manner hereinafter described.

The central portion of the plate-like member section 83 is cut away at 99 to cooperate with the open end 84 of the thimble-like section 83 to render the plate-like section 83 more resilient and to permit the flanges 85 and 86 of the thimble-shaped section 82 to be deformable toward each other.

The outer edges 100 and 101 of the plate-like section 83 converge toward each other from the central portion thereof toward the end flanges 97 and 98, whereby the thickest portion of the plate-like section 83 is disposed at the central portion thereof for a purpose hereinafter described.

While the fastening member 81 can have any desired dimensions, one embodiment thereof that has proven to be satisfactory is approximately 0.612 of an inch from the rear of the thimble-shaped section 82 to the medial portion of the end flanges 97 and 98. The distance between the end flanges 97 and 98 is approximately 0.938 of an inch, while the height of the fastening member 81 is approximately 0.500 of an inch. The tab means 89 and 90, in a manner similar to the tab means 34, 35 and 65, 66 are disposed at acute angles of approximately 60° relative to the center line of the fastening member 81 and are approximately 0.020 of an inch thick.

The fastening member 81 is utilized to secure a trim strip or the like to a vehicle body in substantially the same manner as the fastening members 24 and 53 previously described.

In particular, as illustrated in FIGURE 13, the vehicle body 102 is provided with an aperture 103 in the desired location and defines a pair of opposed edges 104 and 105 of the vehicle body 102. The thimble-like section 82 of the fastening member 81 is inserted into the aperture 103 and is inwardly deformed by the edges 104 and 105 of the vehicle body during such inserting operation until the edges 104 and 105 of the vehicle body 102 are received in the opposed channel means 87 and 88 thereof and permit the thimble-like section 82 to spring outwardly toward its natural position to hold the fastening member 81 in a fixed position relative to the body 102.

The tab means 89 and 90 of the fastening member 81 cooperate with the exterior surface of the vehicle body 102 in substantially the same manner as the tab means 34, 35 and 65, 66 of the fastening members 24 and 53 previously described.

A trim strip 106, having a pair of opposed and inwardly facing flanges 107 and 108, is telescoped over the plate-like section 83 of the fastening member 81 in the manner illustrated in FIGURE 13 by having the flanges 107 and 108 thereof inwardly deform the plate-like section 83 until the flanges 107 and 108 are received in the opposed channel means 91 and 92 thereof. Since the central portion of the plate-like section 83 is wider than the ends 97 and 98 thereof, the central portion is deformed to a greater extent than the ends 97 and 98 during such telescoping operation of the trim strip 106 on to the fastening element 81.

When the trim strip 106 is fully telescoped on to the plate-like section 83 of the fastening member 81, the inside surface 106a thereof compresses the end flanges 97 and 98 thereof between the flanges 107 and 108, and the inside surface 106a whereby the compressed end flanges 97 and 98 urge the flanges 107 and 108 of the trim strip 106 and tab means 89 and 90 of the fastening member 81 in a compact stacked relation against the exterior of the vehicle body 102 to firmly fix the trim strip 106 in a fixed position relative to the vehicle body 102. The compressed end flanges 97 and 98 also tend to deaden any vibrations of the trim strip 106.

Another non-extruded fastening member of this invention is illustrated in FIGURES 15–20 and is generally indicated by the reference numeral 120, the fastening member 120 being molded from suitable flexible material, such as polypropylene, polyethyene, or the like.

The fastening member 120 comprises a rear section 121 interconnected to a front plate-like section 122 by a web-like structure 123.

The rear fastening section 121 includes a pair of opposed side walls 124 and 125 respectively having alternately disposed end edges 126 and 127 interconnected together by an S-shaped web structure 128, the web structure 128 normally tending to hold the side walls 124 and 125 in the position illustrated in FIGURES 15 and 18, but permitting the side walls 124 and 125 to be collapsed toward each other in a manner hereinafter described.

The side walls 124 and 125 respectively have outwardly directed beveled flanges 129 and 130 respectively cooperating with the web structure 123 and section 122 to define a pair of opposed channel means 131 and 132.

It should be noted that the rear section 121 of the fastening member 120 is not thimble-shaped in the same manner as the rear section 82 of the fastening member 81 and that the opposed channel means 131 and 132 of the fastening member 120 face toward the sides thereof rather than toward the top and bottom as provided by the channel means 87 and 88 of the fastening member 81.

The opposed edges of each side wall 124 and 125 of the fastening member 120 gradually converge toward each other as they extend away from the plate-like section 122 thereof to facilitate insertion of the rear section 121 in a suitable aperture of a wall or the like as will be apparent hereinafter.

The front or plate-like section 122 of the fastening member 120 includes a pair of opposed end flanges 133 and 134 interconnected together at the adjacent ends thereof by a pair of opposed side flanges 135 and 136. The outer edges of the side flanges 135 and 136 are respectively notched at 137 and 138 to define a pair of opposed channel means 139 and 140 with outwardly directed tabs 141 and 142 carried by the plate-like section 122 and formed in substantially the same manner as the tabs 89 and 90 of the fastening member 81 previously described.

In addition, the outer edges of the side flanges 135 and 136 converge toward each other as they approach their outer ends whereby the thickest portion of the plate-like section 122 is disposed at the central portion thereof in the same manner as the plate-like section 83 of the fastening member 81.

The web-like structure 123 of the fastening member 120 is provided with a pair of elongated slots 143 and 144 respectively disposed between the sections 121 and 122 thereof to readily permit the side flanges 135 and 136 of the front section 122 to be collapsed toward each other without requiring flexing of the rear section 121 when a trim strip or the like is assembled to the front section 122 of the fastening member 120. Thus, the slots 143 and 144 permit flexing of the fastening member 120, in the same manner that flexing of the fastening member 81 is permitted by the slots 95 and 96 thereof.

While the fastening member 120 can have any desired dimensions, one embodiment thereof which has been found to be satisfactory for attaching trim strips or the like to vehicles or the like is approximately 0.750 of an inch wide between the outermost portions of the end flanges 133 and 134 with the rear section 121 thereof being approximately 0.351 of an inch long. The web-like structure 123 is approximately 0.063 of an inch thick and the distance between the outermost portions of the side flanges 135 and 136 is approximately 0.332 of an inch.

As illustrated in FIGURES 19 and 20, the fastening member 120 is adapted to be disposed in a suitable rectangular opening 145 formed in a wall 146 of a vehicle or the like by press-fitting the rear section 121 of the fastening member 120 into the rectangular aperture 145 whereby the opposed side edges 147 and 148 of the wall 146 progressively cam against the beveled flanges 129 and 130 of the rear section 121 causing the side walls 124 and 125 to be collapsed toward each other until the side edges 147 and 148 are respectively received in the channel means 131 and 132 of the section 121. When the side edges 147 and 148 of the vehicle wall 146 are received in the channel means 131 and 132 of the section 121 of the fastening member 120, the side walls 124 and 125 thereof spring outwardly under the influence of the web structure 128 to hold the fastening member 120 in a fixed position relative to the vehicle wall 146 in substantially the same manner that the thimble-shaped section 82 of the fastening member 81 holds the fastening member in place.

Thereafter, a suitable trim strip 149 or the like having inwardly directed flanges 150 and 151 is telescoped over the front section 122 of the fastening member 120 in the manner illustrated in FIGURE 19 until the flanges 150 and 151 are respectively received in the channel means 139 and 140 thereof to secure the fastening member 149 to the fastening member 120 and, thus, to the vehicle wall 146.

As the flanges 150 and 151 of the trip strip 149 are being telescoped over the front section 122 of the fastening member 120, the same cam the side flanges 135 and 136 toward each other, this flexing of the side flanges 135 and 136 of the fastening member 120 being permitted by the slots 143 and 144 formed in the web structure 123.

It can be seen that the tabs 141 and 142 of the fastening member 120 are compressed between the trim strip 149 and the wall 146 of the vehicle or the like in such a manner that when the flanges 150 and 151 of the trim strip 149 are received in the channel means 139 and 140 the tabs 141 and 142 provide vibration dampening means therebetween in the same manner as the tabs 89 and 90 of the fastening member 81. Similarly, the end flanges 133 and 134 of the fastening member 120 may abut the inner surface 149a of the trim strip 14 when the trim strip 14 is fully assembled to the fastening member 120 to provide vibration dampening means and to cause the flanges 150 and 151 of the trim strip 14 to be compressed against the tabs 141 and 142 of the fastening member 120.

While the various fastening members of this invention previously described are each particularly adaptable for securing relatively long trim strips and the like to vehicle bodies and the like, it has been found desirable to provide a suitable sealant between the fastening member and the vehicle body when relatively short trim strips are to be secured thereto to prevent seepage of moisture longitudinally between the fastening member and the particular aperture provided in the vehicle body or the like.

While such sealant could be applied by hand or machine to the various trim strips of this invention previously described so that the fastening members would perform satisfactorily for securing short trim strips or the like, it has been found that in order to rapidly apply such sealant to fastening members in a particular line production operation, the fastening members 152 and 153 of this invention, illustrated respectively in FIGURES 21 and 25, better lend themselves to this rapid sealant applying operation than do the other fastening members of this invention as will be apparent hereinafter.

In particular, the fastening member 152 illustrated in FIGURES 21-24 comprises a thimble-like section 154 interconnected to a front or plate-like section 155 at the opened end 156 of the thimble-shaped section 154 by a web-like structure 157.

The thimble-shaped section 154 of the fastening member 152 is formed in substantially the same manner as the thimble-shaped section 82 of the fastening member 81 previously described and includes a pair of outwardly directed, opposed beveled flanges 158 and 159 which cooperate with the web-like structure 157 and front section 155 to define a pair of opposed channel means 160 and 161 in the thimble-shaped section 154.

The front section 155 includes a pair of end flanges 162 and 163 interconnected together at adjacent ends thereof by a pair of side flanges 164 and 165, the side flanges 164 and 165 respectively having notches 166 and 167 which cooperate with tabs 168 and 169 carried by the front section 155 to define a pair of opposed channel means 170 and 171 in the front section 155 of the fastening member 152.

The end flanges 162 and 163 and side flanges 164 and 165 are formed in substantially the same manner as the end and side flanges of the fastening members 81 and 120 previously described.

The web-like structure 157 of the fastening member 152 is provided with a pair of elongated recesses 172 and 173 which are each closed at the inner end thereof by a pair of scissor-like tabs 174 and 175 which respectively have outer ends disposed adjacent each other to define a slit therebetween.

As illustrated in FIGURES 22-24, the pairs of scissor-like tabs 174 and 175 are disposed in different planes whereby the sections 154 and 155 of the fastening member 152 can each be flexed independently of the other section thereof in a manner and for a purpose hereinafter described.

While the fastening member 152 can have any desired dimensions, one embodiment thereof which has been found satisfactory for securing short trim strips and the like to vehicle bodies or the like is approximately 0.938 of an inch wide between the outermost portions of the end flanges 162 and 163 and is approximately 0.566 of an inch wide between the outermost portions of the side flanges 164 and 165 thereof. The web structure 157 is approximately 0.078 of an inch thick while the tabs 174 and 175 are each only approximately 0.010 of an inch thick.

One method for rapidly applying a suitable sealant to the fastening members 152 in a line production operation is illustrated in FIGURE 22 and comprises the following steps.

The fastening members 152 are disposed in the position illustrated in FIGURE 22 with the thimble-shaped sections 154 thereof extending upwardly whereby a foamable plastic sealant 176 is dropped from a suitable source at 177 on to the thimble-shaped sections 154 and flows by gravity downwardly around the thimble-shaped sections 154 on to the tab means 174 and 175 and web-like structures 157 thereof, as illustrated in FIGURE 22.

The sealant 176 is originally in liquid form and readily flows over the rear surfaces of the fastening members 152. Because the pairs of scissor-like tabs 174 and 175 effectively close off the recesses 172 and 173 of the web-like structures 157 of the fastening members 152, the liquid sealant 176 does not flow out through the slits provided between the tabs 174 and 175 and can pass over the same toward the tab means 168 and 169 thereof.

Therefore, it can be seen that if the sealant 176 were applied to the thimble-shaped section 82 of the fastening member 81 previously described in this type of line operation, the sealant 176 would flow through the slots or openings 95 and 96 thereof before the sealant 176 effectively closes the recesses 172 and 173.

After the sealant 176 has been applied to a fastening member 152 in the above manner, the sealant 176 begins to foam and cure into a semi-solid state whereby the fastening member 152 can thereafter be inserted in a suitable rectangular opening or aperture 178, FIGURE 23, formed in a wall 179 of a vehicle or the like whereby the sealant 176 effectively seals the fastening member 152 to the wall 179 of the vehicle so that moisture and the like cannot pass transversely between the fastening member 152 and the vehicle wall 179.

As the thimble-shaped section 154 of the fastening member 152 is being inserted in the opening 178 in the vehicle wall 179, the beveled flanges 158 and 159 of the fastening member 152 cam against the opposed edges 180 and 181 of the wall 179 and cause the thimble-shaped section 154 to be compressed until the edges 180 and 181 of the vehicle wall 179 are respectively received in the channel means 160 and 161 thereof in the manner previously described. When the thimble-shaped section 154 of the fastening member 152 is being inserted in the opening 178 of the wall 179, the scissor-like tabs 174 and 175 separate from each other in a manner illustrated in FIGURE 23 to permit such flexure of the thimble-shaped section 154. Because the sealant 176 is in a semi-solid state at this time, the sealant 176 stretches to permit such flexure without breaking at the separated tabs 174 and 175.

After the fastening member 152 has been secured to the vehicle wall 179 in the above manner, a suitable trim strip 182, FIGURE 24, is adapted to have the inwardly disposed flanges 183 thereof telescoped over the front section 155 of the fastening member 152 to be received in the channel means 170 and 171 thereof in the manner previously described. As the flanges 183 of the trim strip 182 are being telescoped over the side flanges 164 and 165 of the fastening member 152, the end flanges 183 of the trim strip 182 cam the side flanges 164 and 165 toward each other in the manner illustrated in FIGURE 24 until the flanges 183 are respectively received in the channel means 170 and 171. Such flexure of the front section 155 of the fastening member 152 is permitted by the tab means 174 and 175 moving relative to each other as illustrated in FIGURE 24 to readily permit the trim strip 182 to be assembled to the fastening member 152.

The tab means 168 and 169 and end flanges 162 and 163 of the fastening member 152 provide vibration dampening means between the trim strip 182 and the vehicle wall 179 in the same manner as the tab means and end flanges of the fastening members 81 and 120.

The other fastening member 153 which lends itself to this rapid sealing applying line operation is illustrated in FIGURES 25–27 and comprises a thimble-shaped section 184 having the opened end 185 thereof interconnected to a front or plate-like section 186 by a web-like structure 187, the fastening member 153 being formed of polypropylene, polyethylene, or the like.

The thimble-shaped section 184 is formed in the same manner as the thimble-shaped section 154 of the fastening member 152 and includes a pair of outwardly directed, opposed beveled flanges 188 and 189 which cooperate with the web-like structure 187 and tabs 190 and 191 of the front section 186 to define a pair of opposed channel means 192 and 193 in the thimble-shaped section 184.

The front section 186 of the fastening member 153 includes a pair of end flanges 194 and 195 interconnected together at adjacent ends thereof by side flanges 196 and 197, the side flanges 196 and 197 respectively having notches 198 and 199 that cooperate with the tabs 190 and 191 to define a pair of opposed channel means 200 and 201 in the front section 186 of the fastening member 153.

The front section 186 of the fastening member 153 is formed in substantially the same manner as the front section 83 of the fastening member 81.

A pair of slots or recesses 202 and 203 are respectively formed in the web-like structure 187 of fastening member 153 and are respectively partially and substantially closed by a pair of tabs 204 and 205 whereby only relatively narrow openings pass completely through the web-like structure 187. The tabs 204 and 205 are so constructed and arranged that the same provide troughs 206 and 207 facing rearwardly from the fastening member 153, as illustrated in FIGURES 26 and 27, for a purpose hereinafter described.

When the liquid foamable plastic sealant 176 is applied from a source 177 on to an inverted fastening member 153 in the manner illustrated in FIGURE 26, the liquid plastic 176 flows downwardly around the rear surface of the thimble-shaped section 184 thereof and collects in the troughs 206 and 207 provided by the tabs 204 and 205. In this manner a sufficient amount of plastic sealant is retained in the troughs 206 and 207 so that when the sealant 176 subsequently foams and cures, the expanding sealant 176 passes over and beyond the remaining narrow opened portions of the slots 202 and 203 toward the tabs 190 and 191 of the fastening member 153. Because the foaming and curing sealant 176 is in a semi-solid state, the foaming semi-solid sealant 176 is adapted to pass over the slots 202 and 203 without entering the slots 202 and 203.

Therefore, it can be seen that the troughs 206 and 207 of the fastening member 153 readily provide means for assuring that a sufficient amount of sealant 176 will be provided for the fastening member 153 even though the slots 202 and 203 pass through the web-like structure 187 in substantially the same manner as the slots 95 and 96 in the fastening member 81 previously described.

After the sealant 176 has been applied to the fastening member 153 and cured thereon, the fastening member 153 can be inserted in a suitable rectangular aperture 208, FIGURE 27, formed in the vehicle wall 209 in substantially the same manner that the fastening member 152 is inserted in the vehicle wall 179 as illustrated in FIGURE 23.

As the thimble-shaped section 184 of the fastening member 153 is inserted in the opening 208 of the vehicle wall 209, the edges 210 and 211 of the wall 209 cam the beveled flanges 188 and 189 of the thimble-shaped section 184 inwardly toward each other until the edges 210 and 211 of the wall 209 are received in the channel means 192 and 193 of the thimble-shaped section 184. Such flexure of the thimble-shaped section 184 is permitted by the slots 202 and 203 formed in the web-like structure 187, as illustrated in FIGURE 27.

After the fastening member 153 has been secured to the vehicle wall 209 in the above manner, a trim strip 212 or the like is adapted to be telescoped over the section 86 thereof in the manner previously described whereby the inwardly directed flanges 213 of the trim strip 212 are received in the channels 200 and 201 of the fastening member 153. As the trim strip 212 is being telescoped over the section 186 of the fastening member 153, the side flanges 196 and 197 of the fastening member 153 are cammed inwardly toward each other by the flanges 213 of the trim strip 212. Such flexure of the section 186 of the fastening member 153 is permitted by the slots 202 and 203, as illustrated in FIGURE 28.

While the fastening member 153 can have any desired dimensions, one embodiment thereof that has been found satisfactory to secure short trim strips to vehicles and the like is identical to the dimensions given for the one embodiment of the fastening member 152 previously set forth except that the tabs 204 and 205 provide openings approximately 0.015 of an inch in the web-like structure 187.

Therefore, it can be seen that the fastening members 152 and 153 of this invention are readily adaptable for securing short trim strips and the like to vehicles and the like because the fastening members 152 and 153 can have a suitable sealant applied thereto in a simple and effective manner to prevent the transfer of moisture between the fastening members and their respective vehicle bodies and the like.

However, it is to be understood that the fastening members 152 and 153 can also be readily utilized to secure long trim strips, if desired, and are not limited to securing only short trim strips as described above.

Accordingly, it can be seen that each of the fastening members of this invention are formed of flexible material and are provided with two interconnected sections each having a pair of opposed channel means formed therein and separated by outwardly directed tab means. Each pair of opposed channel means is adapted to secure one element relative to another element with the tab means disposed therebetween and providing dampening or cushioning means between such elements.

Therefore, it can be seen that the fastening means and methods of this invention can also be utilized to secure any desired pair of elements together other than a trim strip to a vehicle body or the like.

Each section of each fastening member of this invention is adapted to be readily deformed during its securing operation whereby the elements secured thereby are not scratched, marred, or deformed by the fastening member and no tools are required to effect such securing operation.

Not only do such fastening members readily hold together such elements or the like through the natural resiliency of such fastening members and the novel configurations thereof, but the same also provide vibration and noise-dampening means therebetween.

While the form of the invention now preferred has been disclosed as required by the statutes, other forms may be used, all coming within the scope of the claims which follow.

What is claimed is:

1. A flexible fastening member having a first section and having a second section interconnected to said first section, said second section having a pair of opposed end walls, each provided with a pair of side edges, said end walls being interconnected together by a web-like structure extending from one side edge of one end wall to the other side edge of the other end wall, each of said sections having a pair of opposed channel means provided therein.

2. A flexible fastening member as set forth in claim 22 wherein said channel means of said first section are disposed 90° out of phase with the channel means of said second section.

3. A flexible fastening member as set forth in claim 22 wherein said web-like structure has a substantially S-shaped configuration.

4. A flexible fastening member having a thimble-shaped section and having a plate-like section interconnected adjacent the open end of said thimble-shaped section, said sections being interconnected together by a web-like structure having means to permit flexure of each of said sections independently of the other section, said plate-like section having a pair of opposed channel means provided therein, said thimble-like section having a pair of opposed channel means provided therein, said web-like structure having a pair of slots provided therein to provide said means to permit said flexure and having a pair of troughs disposed respectively adjacent said slots.

5. A flexible fastening member having a thimble-shaped section and having a plate-like section interconnected adjacent the open end of said thimble-shaped section, said sections being interconnected together by a web-like structure having means to permit flexure of either of said sections independently of the other section, said plate-like section having a pair of opposed channel means provided therein, said thimble-like section having a pair of opposed channel means provided therein, said web-like structure having a pair of slits provided therein to provide said means to permit said flexure, each slit being defined between the adjacent ends of a pair of tabs defined by said web-like structure.

6. A flexible fastening member having a thimble-shaped section and having a plate-like section interconnected adjacent the open end of said thimble-shaped section, said sections being interconnected together by a web-like structure having means to permit flexure of either of said sections independently of the other section, said plate-like section having a pair of opposed channel means provided therein, said thimble-like section having a pair of opposed channel means provided therein, said web-like structure having a pair of slots provided therein to provide said means to permit said flexure.

7. A fastening member for interconnecting together two elements having a pair of interconnected sections, each of said sections having a pair of opposed channel means provided therein to respectively receive opposed edges of one of said elements to be interconnected thereto, said sections being interconnected together by a web-like structure, said web-like structure having means to permit flexure of either of said sections independently of the other section, said last named means including a slot provided in said web-like structure.

8. A fastening member for interconnecting together two elements and having a pair of interconnected sections, each of said sections having a pair of opposed channel means provided therein to respectively receive opposed edges of one of said elements to be interconnected thereto, said sections being interconnected together by a web-like structure, said web-like structure having means to permit flexure of either of said sections independently of the other section, said last named means including a slit provided in said web-like structure, said slit defining a pair of tab like members having the free ends thereof disposed adjacent to each other.

9. A fastening member for interconnecting together two elements and having a pair of interconnected sections, each of said sections having a pair of opposed channel means provided therein to respectively receive opposed edges of one of said elements to be interconnected thereto, said sections being interconnected together by the web-like structure, said web-like structure having means to permit flexure of either of said sections independently of the other section, said last-named means including a slit provided in said web-like structure, said slit defining a pair of tab-like members having the free ends thereof disposed adjacent to each other, said tab like members being disposed in different planes.

References Cited by the Examiner

UNITED STATES PATENTS

| 2,118,800 | 5/1938 | Smith | 52—718 |
| 2,156,670 | 5/1939 | Van Uum | 85—5 |
| 2,984,877 | 5/1961 | Perrochat | 24—73 |
| 3,114,949 | 12/1963 | Meyer | 24—73 |

FOREIGN PATENTS 229,483    7/1960    Australia.

RICHARD W. COOKE, JR., *Primary Examiner.*